United States Patent [19]

Yamamoto et al.

[11] Patent Number: 4,885,845
[45] Date of Patent: Dec. 12, 1989

[54] INNER DIAMETER MEASURING MACHINE

[75] Inventors: Takeshi Yamamoto; Masanori Arai, both of Kawasaki, Japan

[73] Assignee: Mitutoyo Corporation, Tokyo, Japan

[21] Appl. No.: 196,121

[22] Filed: May 19, 1988

[30] Foreign Application Priority Data

May 20, 1987 [JP] Japan .................................. 62-124682
May 20, 1987 [JP] Japan .................................. 62-124683

[51] Int. Cl.⁴ .................................................. G01B 5/12
[52] U.S. Cl. ...................................... 33/544.5; 33/827; 33/784
[58] Field of Search ............. 33/178 R, 178 E, 178 F, 33/147 F, 147 K, 147 N, 783, 784, 804, 819, 820, 827; 200/330, 61.85

[56] References Cited

U.S. PATENT DOCUMENTS 4,172,325 10/1979 Lendi et al. ...................... 33/178 E
4,536,963 8/1985 Yamamoto et al. ........... 33/143 L X
4,612,656 9/1986 Suzuki et al. .................. 33/147 N X

FOREIGN PATENT DOCUMENTS 164575 12/1933 Switzerland ...................... 33/147 F Primary Examiner—Harry N. Haroian
Attorney, Agent, or Firm—Flynn, Thiel, Boutell & Tanis

[57] ABSTRACT

The present invention relates to an inner diameter measuring machine, wherein a displacement measuring and displaying device provided with a group of first switches for setting measuring conditions are disposed on the generally central portion of a main case of measuring machine. One end of a casing is formed to provide a head having a measuring element or elements, and the other end thereof is formed to provide a handle portion. In the handle portion, two sets of groups of second switches having a switch and the like for holding a displayed value during measuring are provided, so that one hand operation can be performed during measuring. Further, in the handle portion, a plunger axially movable in cooperation with a spindle is provided, whereby this plunger is moved through a control lever rotatably supported on the end portion of the casing.

9 Claims, 4 Drawing Sheets

INNER DIAMETER MEASURING MACHINE

BACKGROUND OF THE INVENTION

1. Field of the Invention

This invention relates to an inner diameter measuring machine wherein measuring elements supported by a measuring element supporting portion of a main body of the measuring machine are linearly moved by means for operating a lever a nd the like in a direction perpendicularly intersecting an axial direction of the main body of the measuring machine to be brought into contact with the inner surface of a hole of an article to be measured, and a movement value of the measuring elements at this time is detected by an encoder to be displayed in a display device.

2. Description of the Related Art

As the inner diameter measuring machine, there has heretofore been known one wherein a displacement value of a spindle is detected by a dial gauge to thereby measure an inner diameter of a hole of an article to be measured. In recent years, there is such a background that, in order to realize high precision measurement, prevention of reading errors, measurement of high added value by adding various functions and the like, an electronic display type inner diameter measuring machine is demanded. Therefore, similarly to other measuring machines, it is conceivable that the inner diameter measuring machine should adopt the electronic display type one too.

Now, since the conventional inner diameter measuring machine adopts a dial gauge as means for displaying a movement value of the spindle, such a construction should necessarily be used that has the dial gauge provided at one end of a body case containing therein the spindle, and operating means provided in the intermediate portion of the case body. Accordingly, even if the operating means is formed of a pair of levers symmetrically arranged, an appropriate position is difficult to be held, thus rendering the mechanism large-sized and complicated. Since one end of the case body becomes heavy, handling is hard and operation is possible only in the vertical position of the case body. Further, a measured value should be visually read while the measuring element is in contact with the inner surface to be measured, whereby the measurable range of a subject to be measured is restricted greatly, thus narrowing the applicability.

On the other hand, in this arrangement, even if the dial gauge is replaced by an electronic type displacement detecting means, when thermal expansion, deformation and the like of the long spindle are taken into consideration, it is difficult to achieve the proper measuring accuracy thereby rendering the results substantially meaningless. The hard handling and restricted measuring position are still unimproved.

As described above, with the inner diameter measuring machine, it has been difficult to make achievement of a desirable measuring accuracy compatible with enlarged applicable range of the article.

An object of the present invention is to provide an inner diameter measuring machine excellent in controllability and handling properties.

Another object of the present invention is to provide an inner diameter measuring machine wherein the measuring accuracy intrinsic to an electronic type displacement detector is not lowered.

SUMMARY OF THE INVENTION

The inner diameter measuring machine according to the present invention includes: a main body of measuring machine provided at one end thereof with a measuring element supporting portion and at the other end thereof with a handle portion; a spindle supported by this main body of measuring machine in a manner to be movable in the axial direction thereof; measuring elements supported by the measuring element supporting portion and provided in a manner to be movable in a direction perpendicularly intersecting the axial direction of the spindle; displacement measuring and displaying means having an encoder for detecting a displacement value of the spindle and a display device for displaying the displacement value; operating means for moving the spindle and the measuring elements; a group of first switches for setting measuring conditions, provided on said displacement measuring and displaying means; and groups of second switches provided on the handle portion for being operated during measuring; said groups of second switches being provided such that said groups of second switches each having a mechanism identical with one another are divided into a plural number, respectively, and arranged at a plurality of positions of the handle portion.

In the handle portion, a plunger extending on the same axial line as that of the spindle is supported. This plunger moves in the main body of measuring machine in cooperation with the spindle through the operation of the operating means. The displacement measuring and displaying means is provided at the substantially central portion of the case of measuring machine, so that an adverse influence due to thermal expansion of the handle portion when the handle portion is gripped does not affect the spindle, in its turn, the encoder. Further, an air damper mechanism is provided between the spindle and the plunger, whereby the spindle is prevented from abruptly moving, so that detecting errors by the encoder can be avoided.

DETAILED DESCRIPTION OF THE PREFERRED EMBODIMENT

One embodiment of the present invention will hereunder be described with reference to FIGS. 1 to 5.

Figure 1:
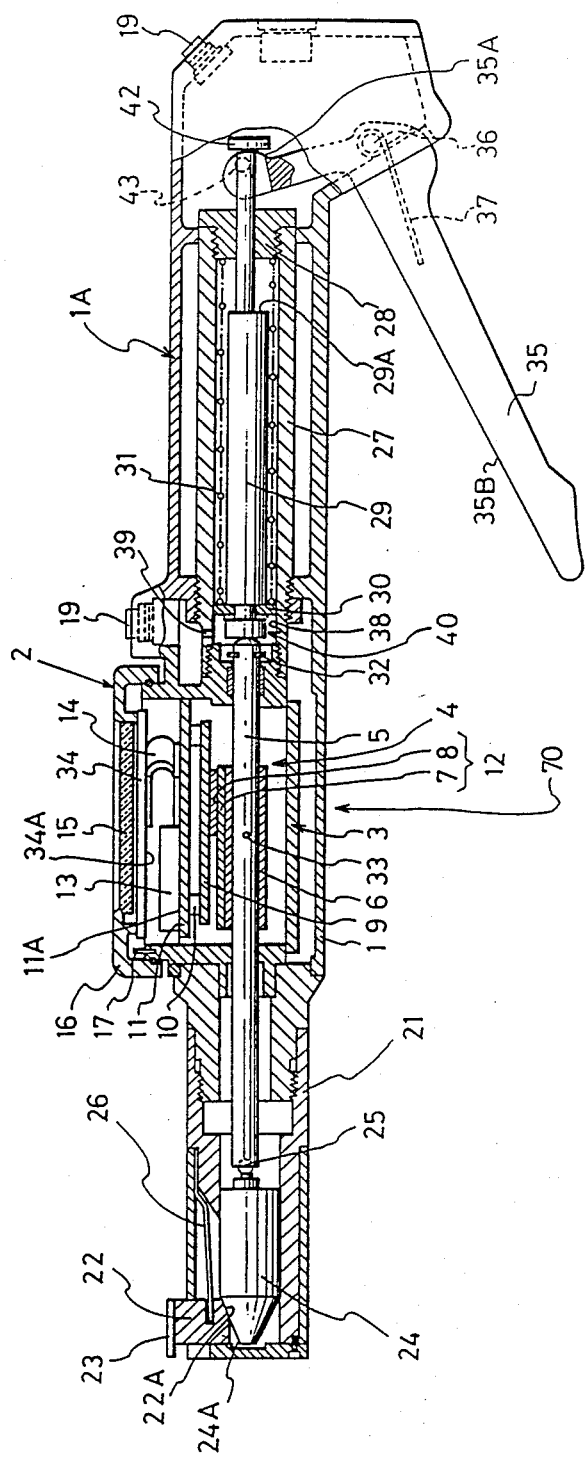
FIG. 1 is a sectional view showing one embodiment of the inner diameter measuring machine according to the present invention.
Figure 2:
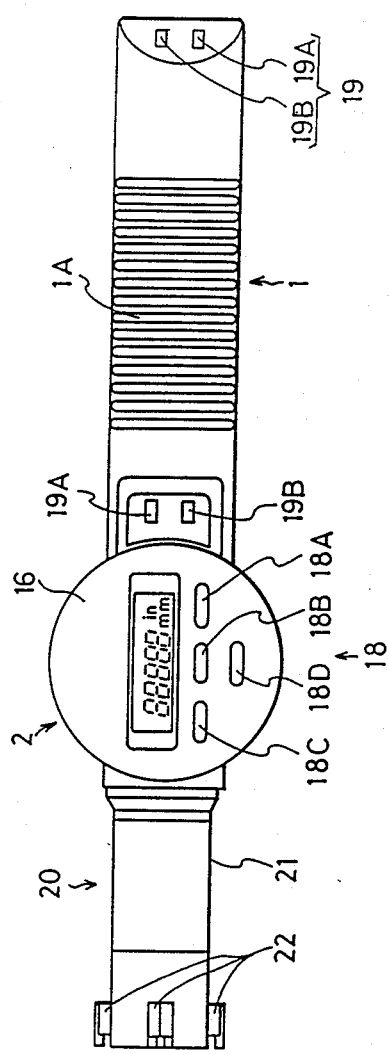
FIG. 2 is a front view of the above embodiment.

In FIGS. 1 and 2 where the general arrangements are shown, a main body 70 of the measuring machine is constituted by a generally flattened tubular casing 1 and a head 21 as being a measuring element supporting portion, and displacement measuring and displaying means 2 is provided at the generally intermediate portion of this main body 70 of measuring machine. As shown in FIG. 2, the casing 1 is formed with a handle portion 1A, the right end of which in FIG. 1 is formed into a generally L letter-shaped bent portion.

The displacement measuring and displaying means 2 has a main body 3 of a display portion of a bottomed cylindrical shape being open at one side. A spindle 5 is supported on this main body 3 of the display portion in a manner to be displaceable in the axial direction thereof. This spindle 5 is regulated in its movement to the left in FIG. 1 at a predetermined position by a stopper 32 provided at a position close to the right end in FIG. 1, and regulated in rotation in the circumferential direction by a rotation-locking pin 33 provided at a generally central portion and a groove, not shown, formed on a side wall of the main body 3 of the display portion.

This spindle 5 is mounted thereto with a main scale 7 through a scale mounting member 6, and, as opposed to this main scale 7, an index scale 8 is mounted to a base plate 11 fixed to the main body 3 of display portion through a scale mounting member 9 and a spacer 10. Here, a capacitance type encoder 12 for detecting the displacement value of the spindle 5 is constituted by the main scale 7 and the index scale 8. The spindle 5 and the encoder 12 constitute displacement measuring means 4. The encoder 12 is electrically connected to electrical equipment 13. In this case, the electrical equipment 13 is constituted by a connector, a counter, a wave-form shaping circuit, a controller and so forth.

A generally inverted tray-shaped cap 16 is rotatably mounted to the opening side of the main body of display device, and this cap 16 is regulated in rotation to one turn or therebelow, i.e. 360° or therebelow by a stopper 17 secured to the main body 3 of display device. As shown in FIG. 1, the cap 16 is provided thereon with a display device 15 for digitally displaying a movement value of the spindle, and a base plate 34. A flat cable 14 for electrically connecting the display device 15 to the electrical equipment 13 is provided between this base plate 34 and the base plate 11 of the main body 3 of display device.

Figure 3:
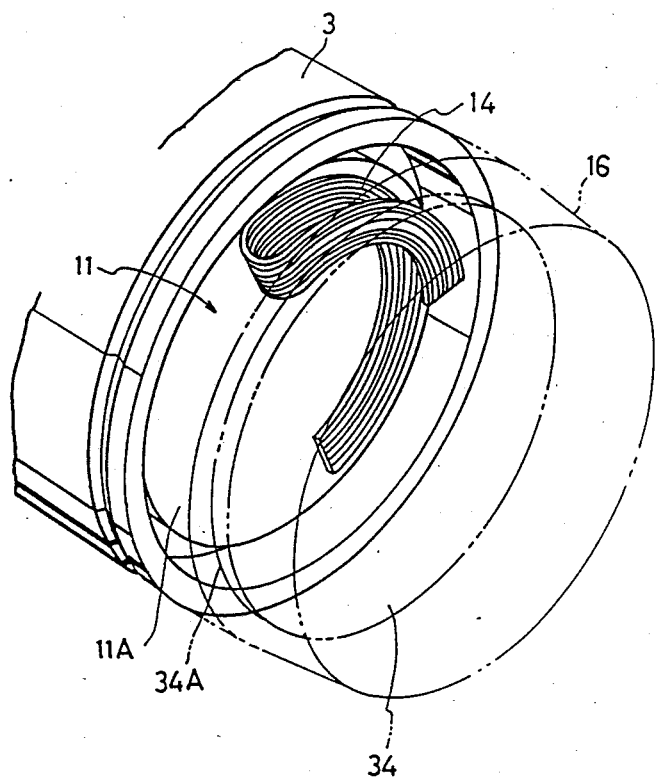
FIG. 3 is a perspective view showing an example of arrangement of a flat cable constituting a portion of a displacement measuring and displaying means.
Figure 4:
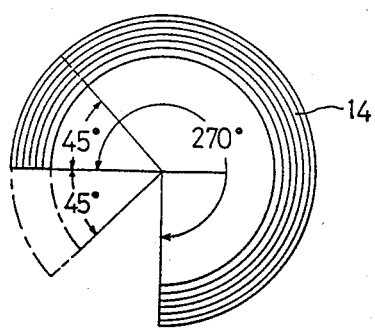
Figure 6:
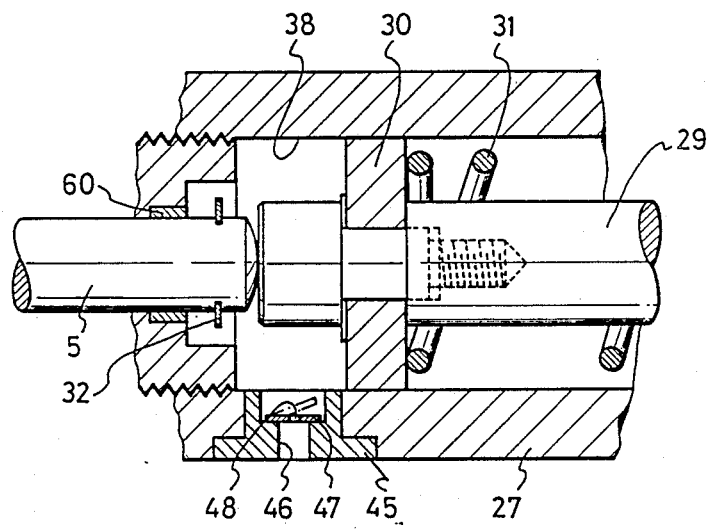
FIG. 6 is a sectional view showing an example of modification of the air damper mechanism.

The flat cable 14 is of a belt-shaped body in which a plurality of wirings are arranged in parallel to one another, having a predetermined curvature and formed into a circularly arcuate shape of 270°±45° in a free state (Refer to FIG. 4). As shown in FIG. 3, this flat cable 14 is secured to the base plates 11 and 34 in a state where the intermediate portion thereof is reversed. In this case, the base plates 11 and 34 are arranged such that guide surfaces 11A and 34A thereof opposed to each other are in parallel to each other. The flat cable 14 is positioned on a locus of a hypothetical circle centered about an axis of rotation of the cap 16, and brought into contact with ring-shaped guide surfaces, not shown, formed on the guide surfaces 11A and 34A, to thereby be guided in contact. This flat cable 14 has such a flexible construction as to have an elastic force sufficient for being contacted and guided by these ring-shaped guide surfaces, which is not so low as an elastic force of cloth, but has an elastic force of ordinary paper for example.

As shown in FIG. 2, on the outer surface of the cap 16, there are arranged a group of first switches 18 consisting of an ON-OFF switch 18A, an inch-milli change-over switch 18B, a preset switch 18C and a zero switch 18D, for setting measuring conditions. Two sets of groups of second switches 19 for being operated during measuring, each consisting of a hold switch 19A for being operated during measuring and a data take-in switch 19B which are arranged in a symmetrical arrangement are opposed to the handle portion 1A between the handle portion 1A and the main body 3 of the display device, and at the right end portion in FIG. 1 of the handle portion 1A, respectively. The switch groups 18 and 19 are connected to the electrical equipment 13, and, by the operation of these switch groups 18 and 19, the measured values are displayed and held in the display device 15.

A plurality of measuring elements 22 linearly movable in a direction perpendicularly intersecting the moving direction of the spindle are provided at regular intervals on the forward end portion of the head 21. Each of these measuring elements 22 is provided on the forward end portion thereof with a pin-shaped contact 23 capable of contacting the inner surface of a hole of the article to be measured and at the base end portion thereof with a tapered surface 22A. A cone 24, functioning as a displacement converting means, has a conical portion 24A opposed to this tapered surface, is reciprocatorily movably provided in the head 21, with the axis thereof being aligned with the axis of the spindle. The cone 24 is brought into contact with one end of the spindle 5 through a ball 25, whereby the axial movement of the spindle 5 is converted into a radial displacement of the measuring elements 22, and a displacement value of the measuring elements 22 is detected by the encoder 12 through the spindle 5. A spring on leaf spring sheet 26 functions as a first biasing means for constantly biasing the measuring elements 22 toward the cone 24 and biasing the spindle 5 toward the handle portion 1A through the cone 24 confined between the measuring elements 22 and the head 21.

In the grip portion 1A, a tubular member 27 is provided along the extending direction of the casing 1. A bush 28 is threadably coupled to the right end in the drawing of this tubular member 27, and a plunger 29 extending on the same axial line as the axial line of the spindle is provided in the tubular member 27. The right end portion in Fig. 1 of this plunger 29 is reciprocatorily movable in the axial direction, penetrating through the bush 28, and, a stroke of the plunger 29 to move to the right end portion is regulated to a predetermined value by a stepped portion 29A formed in the intermediate portion of the plunger 29. On the other hand, a partition member 30 is coupled onto the left end portion of this plunger 29, i.e. on the side of the spindle 5, and slidable on the inner wall of the tubular member 27. The left end face of the plunger 29 is in contact with the spherical end portion formed at the right end of the spindle 5. Confined between the partition member 30 and the bush 28 is a compression coil spring 31 as being second biasing means, which has a biasing force stronger than that of the sheet spring 26, so that the plunger 29 is constantly biased in a direction of contacting the spindle 5.

Defined by the tubular member 27, the main body 3 of display device and the partition member 30 is a cylinder chamber 38, which surrounds a contact portion between the spindle 5 and the plunger 29, and is variable in volume due to a reciprocatory movement of the plunger 29 and the like. Formed at a portion of the tubular member 27 defining this cylinder chamber 38 is a through-hole 39 communicating the interior of the cylinder chamber 38 with the exterior thereof. This through-hole 39 is formed to have a size sufficient for regulating an abrupt movement of the plunger 29, and in its turn, of the spindle 5. Here, an air damper mechanism 40 is constituted by the cylinder chamber 38 and the through-hole 39.

Figure 5:
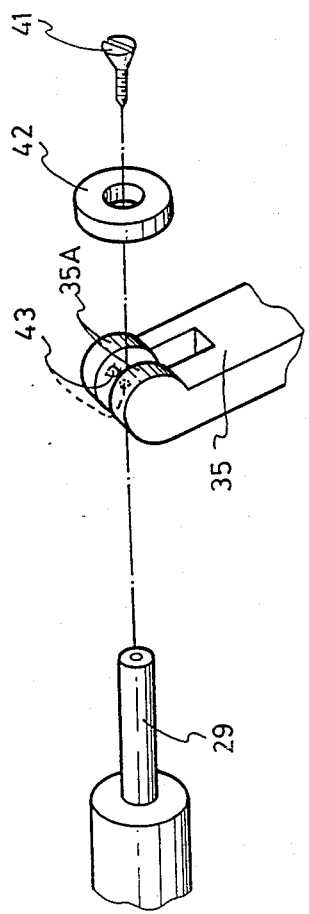
FIG. 5 is a disassembled perspective view showing a portion of engagement between the plunger and the operating means.

Mounted to the bent portion of the casing 1 is a bell crank-shaped control lever 35 as being measuring element operating means, which is rotatable about a pivot 36. The longer side of this control lever 35 is formed into a handle portion 35B, which is exposed to the outside of the casing 1, while, the shorter side thereof is engaged with one end of the plunger 29 in the casing 1. As shown in FIG. 5, the portion of engagement between the control lever 35 and the plunger 29 is constituted by a circularly arcuate contact portion 35A bifurcated at the shorter end portion of the control lever 35 and a ring 42 secured to one end of the plunger 29 through a screw 41. This ring 42 is fixed to one end portion of the plunger 29 such that one end portion of the plunger 29 is inserted through the circularly arcuate contact portion 35A in a manner to be axially movable. Formed on the inner surface of the circularly arcuate contact portion 35A are a pair of projections 43 for preventing the plunger 29 from falling off the circularly arcuate contact portion 35A. A torsional coil spring 37 is confined between the control lever 35 and the casing 1, whereby the lever 35 is constantly held in contact with the ring 42, so that the lever 35 can be prevented from being unsteady.

OPERATION

Action of this embodiment will hereunder be described.

First, in setting the measuring conditions by use of the group of first switches including the ON-OFF switch 18A, inch-milli changeover switch 18B and the like, necessary switches are operated. Thereafter, the control lever 35 is gripped by one hand such that the inner surface of a thumb is brought into contact with the handle portion 1A and the remaining the other four fingers are applied to the control lever 35, and the control lever 35 is rotated. With this operation, the plunger 29 is moved in a direction of being separated from the spindle 5 against the biasing force of the coil spring 31 through the circularly arcuate contact portion 35A and the ring 42. Then, the force of the measuring element 22 projecting outwardly diminishes, whereby the measuring elements 22 are immersed into a main body of the head 21 through the agency of the sheet spring 26, so that the spindle 5 is moved together with the plunger 29 to the right in the drawing through the cone 24. In this case, since the springy force of the sheet spring 26 is low and the through-hole 39 of the cylinder chamber 38 functions as an orifice, the spindle 5 can avoid moving abruptly.

In this state, a measuring head 20 is inserted into the inner surface of the hole of the article, not shown, and further, the force gripping the lever 35 is relaxed. With this operation, the plunger 29 is biased in the direction of the spindle 5 by the biasing force of the coil spring 31, the measuring elements 22 are projected outwardly through the spindle 5 and the cone 24, and the contact 23 is brought into contact with the inner surface of the hole. In this case, the plunger 29 together with the partition member 30 are moved, whereby pressure is generated in the cylinder chamber 38. However, the through-hole 39 functions as the orifice, whereby the plunger 29 is moved slowly, so that the spindle 5, the cone 24 and the measuring element 22 are regulated in abrupt movement. Accordingly, reading errors in the encoder 12 can be avoided.

Here, prior to bringing the contact 23 into contact with the inner surface of the hole, the cap 16 is rotated relative to the main body 3 of display device, whereby the display device 15 is located at a position where display is easily read. When the cap 16 is rotated, the flat cable 14 functions to be successively transferred to the side of the main body 3 of display device or the side of the cap 16, forming a boundary just at the turned back portion, so that a high rotational force is not required. Moreover, the flat cable 14 is in contact with the base plates 11 and 34, which are secured to the main body 3 of display device and the cap 16 so as to generate a closely contacting force, whereby no tensile forces, etc. are produced at opposite ends of the flat cable 14, so that disconnection, come-off of a terminal and the like can be avoided, and further, untwisting of the flat cable 14 does not occur owing to the rigidity thereof.

Further, thereafter, when the hold switch 19A out of the group of second switches 19 located on the side of the main body 3 of display device is operated by the hand holding the handle portion 1A, measured values successively varied and displayed on the display device 15 are held.

On the other hand, when the groups of second switches 19 provided at the right end portion in the drawing of the handle portion 1A are used, the way in which the handle portion 1A and the control lever 35 is gripped should be changed. More specifically, if the way of holding or gripping is changed such that the thumb is applied to the outer side surface of the control lever 35 and the remaining four fingers are applied to the handle portion 1A, the groups of switches 19 can be operated by the forward end of the thumb.

According to the embodiment described above, the group of first switches 18 for setting the measuring conditions and the groups of second switches 19 for being operated during measuring are provided on the displacement measuring and displaying means 2 and on the handle portion 1A, separately of each other, whereby, by changing the gripping way between the handle portion 1A and the control lever 35, the switches can be selectively used, so that switches can be operated under the suitable conditions, meeting the position of the measuring machine, thus offering the advantage of greatly improving in expanding the scope of application. Moreover, the two sets of the groups of second switches 19 are in the symmetrical arrangement relative to the handle portion 1A, so that one hand operation can be performed with no mistaken operation of the switches. Moreover, according to this embodiment, one of the groups of switches out of the groups of switches 19 are provided at one end portion of the handle portion 1A, so that measuring of a hole having a large depth can be performed reliably. The cap 16 is rotatably mounted to the main body 3 of display device 3, whereby the display device 15 can be constantly set at a position of easy reading, so that the both controllability and the handling properties can be improved as viewed in light of this.

Further, due to the air damper mechanism 40, the spindle 5 is regulated in abrupt moving, whereby the spindle 5 can be prevented from moving abruptly and the measuring elements 22 can be prevented from abrupt collision into the inner surface of the hole of the article, so that reading errors of the encoder 12 can be avoided, thus enabling to maintain the measuring accuracy. Moreover, the spindle 5 and the plunger 29 are provided separately of each other, whereby the spindle 5 is not affected by unreliable operation of the plunger 29 through the control lever 35, so that the dimension of the spindle 5 can be shortened reliably and the spindle 5 can be supported satisfactorily.

Further, the spindle 5, scales 7, 8 and the like, which are concerned with the measuring, are not provided in the handle portion 1A, whereby the influence due to the thermal expansion caused by the gripping of the handle portion 1A does not directly affect the spindle 5 and the like, so that the measuring accuracy can be maintained as viewed in light of this.

The flat cable 14 comes into contact with the guide surfaces 11A and 34A of the base plates 11 and 34, which are secured to the main body 3 of display device and the cap 16 so as to generate the closely contacting force, whereby no tensile force, etc. are produced at the opposite ends of the flat cable 14, so that disconnection, come-off of a terminal and the like can be avoided. This means that the flat cable 14 may be formed into multi-layers, thus offering such an advantage that the flat cable 14 as being of multi-layers can be applied to the type having a multiplicity of wirings. Moreover, the flat cable 14 is formed into a circularly arcuate shape, so that the inner space thereof can be made large. Even if the main body 3 of display device separated from the cap 16, repairs and disassembling during adjusting can be performed with the flat cable 14 being connected because the flat cable 14 can be extended in the axial direction. Furthermore, part assembling is possible after wiring of the flat cable 14, so that the assembling and disassembling can be performed very easily.

The control lever 35 is brought into contact with the plunger 29 by the spring 37, so that unsteadiness, and in its turn, mistaken operations of the lever 35 during measuring can be avoided.

According to the present invention, the groups of second switches 19 are divided into two groups, with one of which being provided in the proximity of the main body 3 of display device and the other of which being provided at the end portion of the handle portion 1A, however, groups of switches having the mechanisms identical with one another may be provided at a plurality of positions, and ones which are provided at positions other than the above, for example as the central portion of the handle portion 1A or any other position, may be adopted. The encoder 12 need not necessarily be limited to the capacitance type, and a photoelectric type one having a light receiver, a light emitter and the like, and further, any other type such as an electromagnetic type and a magnetic type may be adopted.

Further, the air damper mechanism 40 in the above embodiment may adopt an arrangement other than the above, and may be formed into the arrangement shown in FIG. 5 for example. More specifically, such an arrangement may be adopted that the interior and exterior of the cylinder chamber 38 are communicated with a valve mounting member 45 secured to the tubular member 27, the valve mounting member 45 is formed with a large hole 46 having a diameter larger than the through-hole 39 described in the above embodiment, and a small hole 48 about equal in diameter to the through-hole 60 described in the above embodiment is formed in a valve 47 secured to this valve mounting member 45 on the side of the cylinder chamber 38. With this arrangement, when the control lever 35 is rotated to move the plunger 29 against the biasing force of the coil spring 31, the valve 47 is opened due to negative pressure produced in the cylinder chamber 38, whereby air flows into the cylinder chamber 38 through the large hole 46, so that the plunger 29 can move smoothly. On the other hand, when the control lever 35 is released to move the plunger 29 toward the spindle 5 by the biasing force of the coil spring 31, the valve 47 is closed, whereby air in the cylinder chamber 38 is made to flow through the small hole 48, so that the plunger 29, the spindle 5 and the like are regulated in abrupt moving. Accordingly, even with this arrangement, such an advantage that the measuring accuracy can be maintained is offered. In the above embodiment, the operating means has been made to be the bell crank-shaped control lever 35, however, according to the present invention, the operating means may be a push-button or the like arranged on the axial line of the plunger 29, for moving the plunger 29 along the axial line thereof. The displacement converting means need not necessarily be limited to the cone 24, and may be an L letter-shaped lever or the like which is rotatably mounted to the head 21, for converting the axial movement of the spindle 5 into the linear movement of the measuring element for example. Further, the first biasing means may be formed of a coil spring or the like, and the second biasing means may be formed of a sheet spring or the like, regardless of the type of spring. The switches 18 and 19 need not necessarily be provided on the cap 16 of the displacement measuring and displaying means 2 and the handle portion 1A, separately of each other. Further, such an arrangement may be adopted that the cap 16 is locked against rotation relative to the main body 3 of display device and the display device 15, the electrical equipment 13 and the like may be wired with ordinary cables, not with the flat cable 14. The encoder 12 need not necessarily be limited to the capacitance type one, and may be ones of types including a photoelectric type having the light receiver, light emitter and the like, an electromagnetic type, a magnetic type and the like. Further, the construction of engagement between the plunger 29 and the lever 35 may be of any other construction such for example as one wherein an engageable projection is integrally formed on the plunger 29.

The present invention as described above can offer such an advantage as to provide the inner diameter measuring machine excellent in the controllability and handling properties and capable of measuring with high precision.

What is claimed is:

1. An inner diameter measuring machine comprising:
    housing means defining an elongated main body of said measuring machine having at one end thereof a measuring element supporting portion and at the other end thereof a handle portion;
    a spindle and first support means on said main body of said measuring machine for supporting said spindle for axial movement relative to said main body;
    at least one measuring element and second support means for supporting said at least one measuring element for movement in first and second directions perpendicularly intersecting the axial direction of movement of said spindle;
    displacement measuring and displaying means mounted on said housing means intermediate said measuring element supporting portion and said handle portion, said displacement measuring and displaying means having an encoder for detecting a displacement value of the relative movement between said spindle and said housing means and a display device for displaying said displacement value;

manually operable means mounted on said handle portion for facilitating said movement of said measuring element in said first direction in response to a manual gripping of said manually operable means, said manually operable means also including means for effecting a movement of said measuring element in said second direction in response to said manually operable means being free of any manually operative force applied thereto;

a group of first switches for setting measuring conditions, provided on said displacement measuring and displaying means;

plural groups of operatively redundant second switches provided at plural locations on said handle portion capable of being operated by either the fingers or the thumb on one hand while said manually operable means is gripped by said one hand, whereby a selected one of said plural groups of second switches can be operated by either the fingers or the thumb depending on the way that said one hand grips said handle portion and said manually operable means.

2. The inner diameter measuring machine as set forth in claim 1, wherein said plural groups of second switches are arranged in a symmetrical arrangement at opposite ends of said handle portion.

3. The inner diameter measuring machine as set forth in claim 1, wherein said plural groups of second switches include data take-in switches and hold switches.

4. The inner diameter measuring machine as set forth in claim 1, wherein said displacement measuring and displaying means is provided at the generally central portion of said main body of said measuring machine.

5. The inner diameter measuring machine as set forth in claim 1, wherein said encoder is of a capacitance type.

6. The inner diameter measuring machine as set forth in claim 1, wherein an axially movable plunger is provided between said spindle and manually operable means, and said plunger is provided in said handle portion.

7. The inner diameter measuring machine as set forth in claim 6, wherein an air damper mechanism is provided on said handle portion for regulating said axial movement of said spindle and preventing abrupt movements thereof.

8. The inner diameter measuring machine as set forth in claim 7, wherein said air damper mechanism includes a cylinder chamber surrounding a contact portion between said spindle and said plunger, said cylinder chamber having a through-hole therein providing air communication between the interior and the exterior of said cylinder chamber.

9. The inner diameter measuring machine as set forth in claim 1, wherein said display device constituting a portion of said displacement measuring and displaying means includes means for rotatably supporting said display device.

* * * * *